US007018076B2

(12) United States Patent
Pinho et al.

(10) Patent No.: US 7,018,076 B2
(45) Date of Patent: Mar. 28, 2006

(54) HIGH PERFORMANCE REFLECTOR COOLING SYSTEM FOR PROJECTORS

(75) Inventors: George P. Pinho, Waterloo (CA); O. Nicholas Komarnycky, Kitchener (CA); Richard Matthews, Peterborough (CA)

(73) Assignee: Christie Digital Systems, Inc., Ontario (CA)

( * ) Notice: Subject to any disclaimer, the term of this patent is extended or adjusted under 35 U.S.C. 154(b) by 162 days.

(21) Appl. No.: 10/640,640

(22) Filed: Aug. 14, 2003

(65) Prior Publication Data

US 2005/0117349 A1 Jun. 2, 2005

(51) Int. Cl.
*F21V 7/20* (2006.01)
*F21V 29/02* (2006.01)

(52) U.S. Cl. .................. 362/345; 362/294; 362/298
(58) Field of Classification Search ................ 362/264, 362/294, 298, 300, 302, 345, 373, 580
See application file for complete search history.

(56) References Cited

U.S. PATENT DOCUMENTS

| | | | |
|---|---|---|---|
| 1,256,522 A * | 2/1918 | Croxton ..................... 362/299 |
| 3,087,381 A * | 4/1963 | Moffatt ...................... 362/345 |
| 3,639,751 A * | 2/1972 | Pichel ........................ 362/294 |
| 4,460,939 A * | 7/1984 | Murakami et al. .......... 362/294 |
| 5,099,399 A * | 3/1992 | Miller et al. ................ 362/580 |
| 6,004,010 A * | 12/1999 | Inage et al. ................. 362/294 |
| 6,161,946 A * | 12/2000 | Bishop et al. .............. 362/302 |
| 6,227,682 B1 * | 5/2001 | Li ............................... 362/302 |

OTHER PUBLICATIONS

Demura et al, Apr. 23, 1992, Copyright 2005 Derwent Information LTD, (SU 1728573A) Abstract publication "Composite reflector lamp-", basic abstract and one figure.*

* cited by examiner

*Primary Examiner*—Alan Cariaso
(74) *Attorney, Agent, or Firm*—Staas & Halsey LLP

(57) ABSTRACT

A high performance compound reflector and cooling system for use with a projection system having a lamp for emitting light, an ellipsoid reflector for capturing said light from a first focal point of the ellipsoid reflector and focusing said light at a second focal point co-incident with an integrator rod, and a spherical reflector for retro-reflecting light through the first focal point for reflection by said ellipsoid reflector to said second focal point. The shape of the ellipsoid reflector according to the present invention allows the spherical element to have a larger diameter at the interface between the ellipsoid and sphere. This provides a location for an air deflector in a shape similar to the back of the ellipsoid for channeling air over and outside of the ellipsoid and then along the inside of the sphere. The design of the reflector and air deflector allow cooling requirements to be substantially reduced.

18 Claims, 4 Drawing Sheets

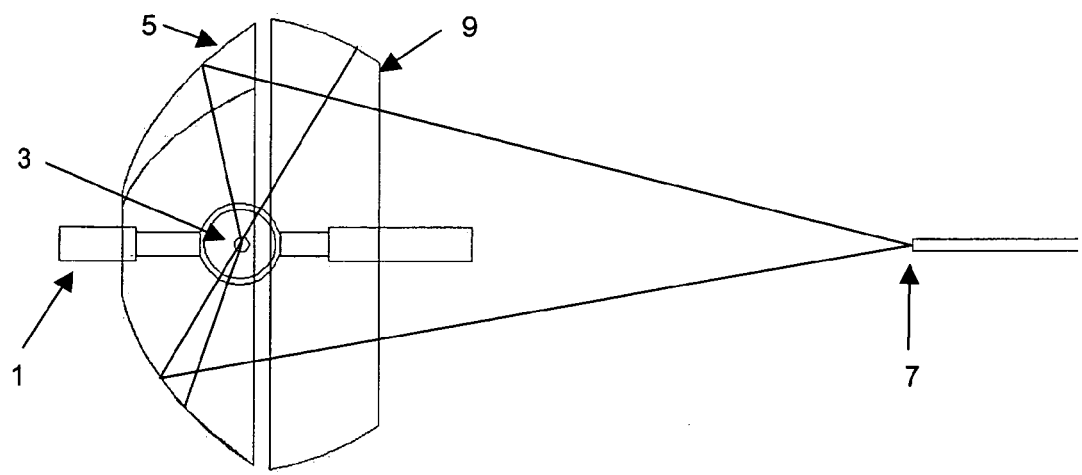
Figure 1- Prior Art
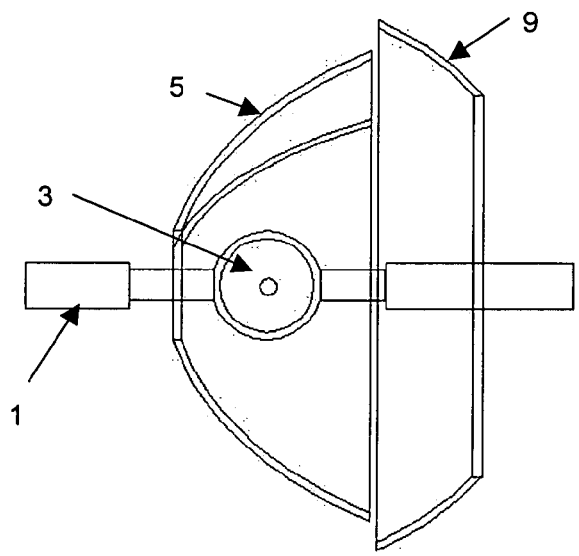
Figure 2

HIGH PERFORMANCE REFLECTOR COOLING SYSTEM FOR PROJECTORS

BACKGROUND OF THE INVENTION

1. Field of the Invention

The present invention is directed to digital cinema projectors, and more particularly to a high performance compound reflector and cooling system for use with projection lamps such as Xenon (Xe) lamps.

2. Description of the Related Art

High-end projectors that are capable of 8000 lumens and higher, typically use Xe bubble lamps coupled to an ellipsoidal reflector. The reflected light is captured from the first focal point of the reflector and is re-imaged at a second focal point. The second focal point is usually co-incident with an integrator rod or some other means of homogenizing the light. Illumination optics is then used to image the light from the integrator rod onto a light valves for projection. Typically, the ellipsoidal reflector contains a secondary spherical reflector. This allows the ellipsoidal reflector to be more compact, thereby reducing the size of the projector without sacrificing light collection efficiency of the reflector.

Reflectors used for lamps in the 1–6 KW range are typically made of metal (e.g. nickel deposit) or glass. Along with reflecting visible light, the reflectors also serve the purpose of removing infrared light generated by the lamp from the second focal point. This helps in reducing the amount of heating within the projector and is vital for projector performance. With metal reflectors this is accomplished by using IR absorbing coatings at the reflector surface. IR transmitting coatings tend to be used in glass reflectors. In either case, effective cooling must be applied to the reflector and the lamp for proper operation.

To that end, air is usually directed onto the reflector surface, either directly or by the use of ducting, to maintain the reflector temperature and temperature gradient below a predetermined threshold above which damage can occur. The most straightforward method is to force air axially onto the reflector. However, this is not usually done because of size constraints. In most cases air is forced onto the side of the reflector and ducting is used to re-distribute the air. This often results in areas of the reflector having high temperature gradients, resulting in local distortion and reduced coupling efficiency. Typically, for metal and glass reflectors operating with 0 KW lamps, up to 800 cfm of air flow is required for effective cooling. The lamp ends and bulb also need to be cooled. When air is used to cool the reflector from the side, effective cooling occurs for one lamp end. To cool the hub, air must be forced through the back opening of the reflector, over a first end of the bulb, over the center of the bulb and finally over the opposite end. However, air flow over the opposite end is usually too low for cooling. A second fan and/or complex extra ducting from the primary fan is therefore often used to provide cooling for the opposite lamp end.

In order to make smaller and brighter projectors the reflector size must be decreased while the lamp power remains the same. The smallest reflectors for a given lamp power are made of glass. This is because IR transmissive coatings can be used to remove the lamp heat. In the use of such coatings, the glass temperature and therefore coating temperature remain lower than if the reflector were made of metal. Thus a smaller reflector can be made.

Nonetheless, ensuring cost effective and efficient cooling of the reflector for high power Xe lamps (i.e. greater than 1 KW) while optimizing light collection on the integrator rod, remains a difficult challenge to projector designers.

SUMMARY OF THE INVENTION

It is an aspect of the present invention to provide a specific ellipsoidal shape of reflector for accommodating a cooling system. The shape of the ellipsoidal reflector according to the present invention allows the spherical element to have a larger diameter at the interface between the ellipsoid and sphere. This provides a location for an air deflector in a shape similar to the back of the ellipsoid for channeling air over and outside of the ellipsoid and then along the inside of the sphere.

This together with other aspects and advantages that will be subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic representation of a reflector and lamp for a projector according to the prior art.

FIG. 2 is a schematic representation of a reflector and lamp for a projector according to the present invention.

FIG. 4b is a front view in the direction of the arrow B In FIG. 4a.

DETAILED DESCRIPTION OF THE PREFERRED EMBODIMENTS

Figure 3:
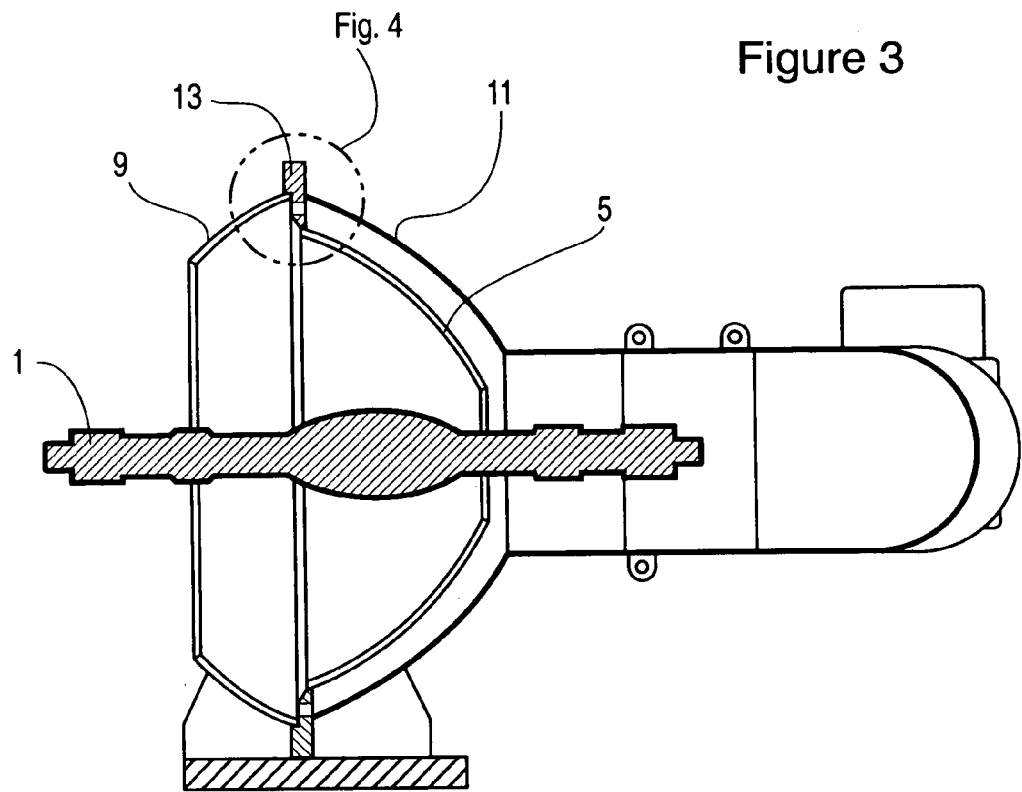
FIG. 3 is a cross-sectional view showing details of a reflector mount with interface plate and air deflector for the reflector and lamp of FIG. 2.

FIG. 1 shows the typical application of a compound lamp reflector. Light is generated by a lamp 1 having a bulb located at a first focal point 3 of ellipsoid reflector 5. Light is re-imaged at a second focal point 7 that is co-incident with an integrator rod. A secondary spherical reflector 9 provides retro-reflection of light from the first focal point 3 to allow the ellipsoidal reflector to be of compact design.

The layout of FIG. 1 shows rays reflecting off ellipsoid reflector 5 and retro reflecting off the sphere 9 to focal point 3 and then reflected to focal point 7. The location of the first focal point in relation to the vertex of the ellipsoid determines the location and power of lamp that can be used and thus limits the size of reflector. With a 6 kW lamp the focal point must be further from the vertex than for lower powered lamps, so that the lamp is further from the walls of the reflector thus increasing size. For the design of FIG. 1, the focal point is 103 mm from the vertex of the reflector.

The shape of the ellipsoidal reflector 5 in FIG. 2 allows the spherical element 9 to have a larger diameter at the interface position. This provides a location for channeling air over and outside of the ellipsoid 5 and then along the inside of the sphere 9. The outer surface of both the ellipsoid and the sphere are polished to reduce the amount of IR light scattering and thereby increase IR transmission by as much as 20%. The reduced IR scattering results in less reflector heating and lower cooling requirements. The reflector design of FIG. 2 positions the first focal point at 60 mm allowing the lamp to be closer to the reflector surface and thus allows the whole reflector to be much smaller than in FIG. 1.

Figure 4A:
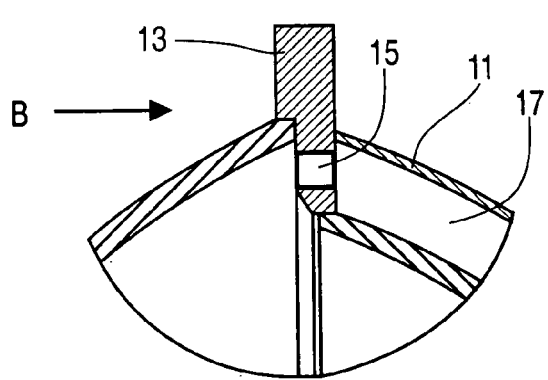
FIG. 4a shows details of the interface plate from a side view.
Figure 4B:
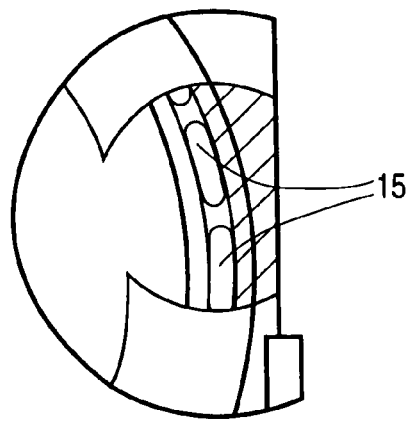

As shown in FIG. 3, an air deflector 11 connects the ellipsoid 5 and the sphere 9 at an interface plate 13. The air deflector has a shape similar to the back of the ellipsoid 5 and is sealed against the interface plate. The interface plate 13 is designed with air vents 15 along the circumference between the spherical reflector 9 and the ellipsoidal reflector 5 to allow air to flow from the ellipsoid to the sphere, as shown in detail with reference to FIG. 4.

The air deflector 11 is painted black on the inside surface with high temperature paint. Its purpose is to absorb the IR radiation that is transmitted through the reflector 5 and prevent it from being reflected back into the reflector to cause increased heating. This is helpful as the air deflector is usually made from spun aluminum, which is very reflective a: IR wavelengths.

Figure 5:
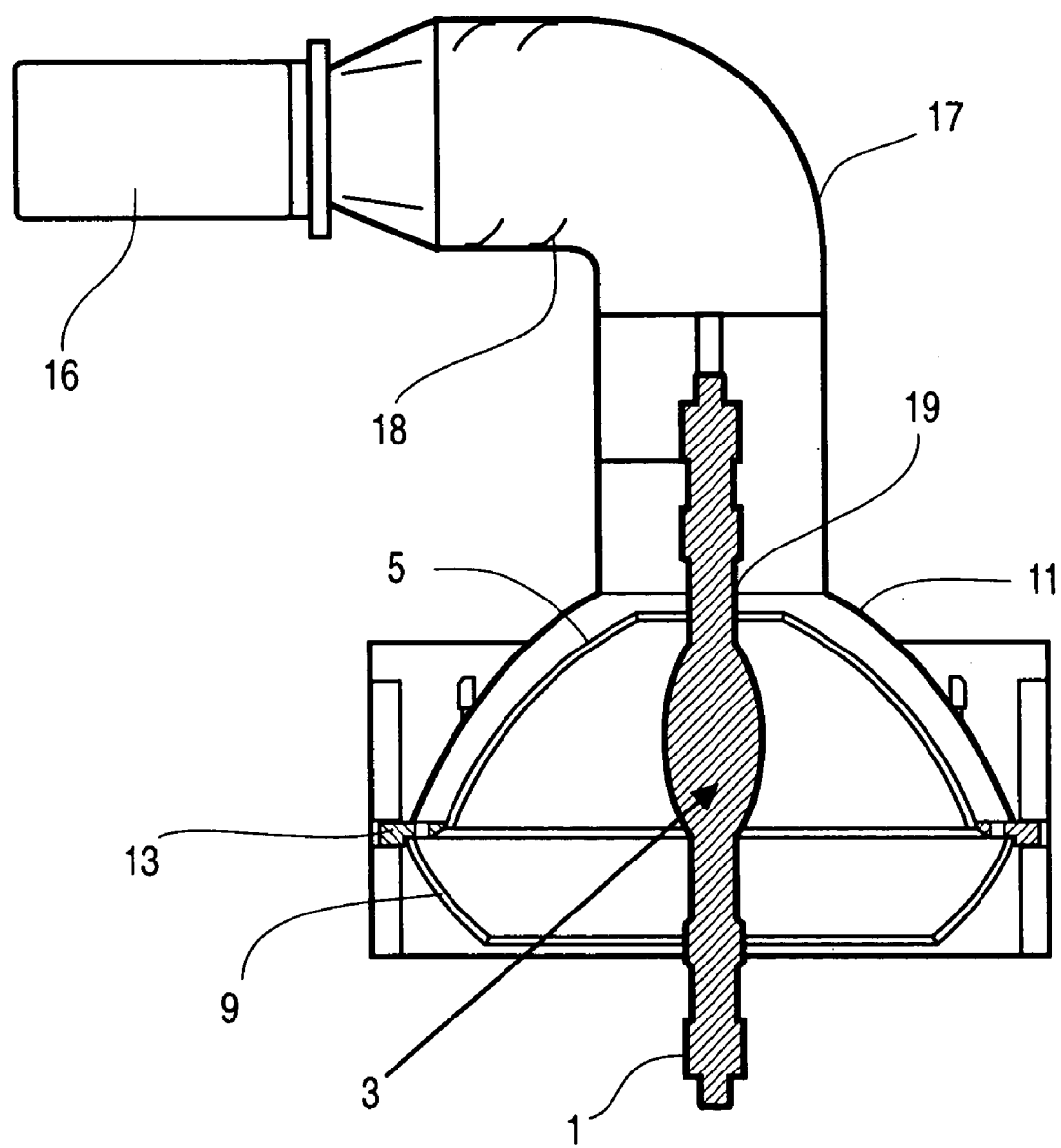
FIG. 5 is a top view of the reflector in FIG. 3 showing a blower fan for blowing air into the back of the reflector.
Figure 6:
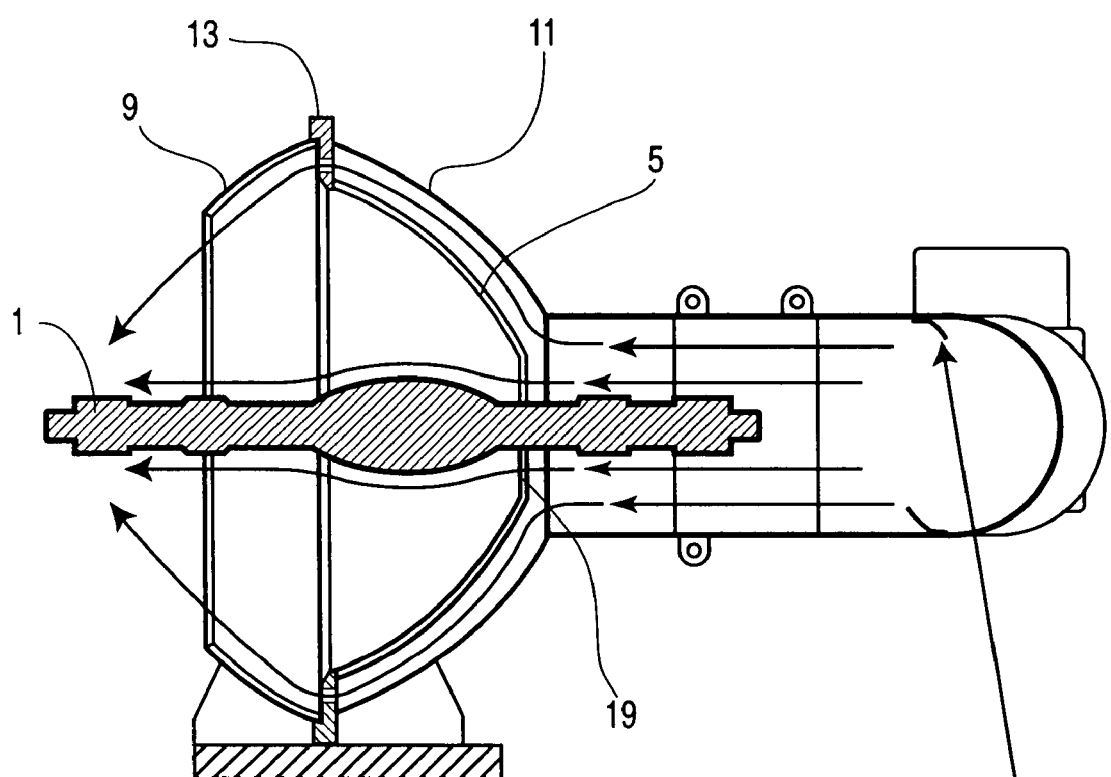
FIG. 6 depicts the airflow created by the reflector design of FIG. 2.

To cool the system, air is directed into the back at the base of the lamp 1 by a centrifugal blower fan 16 for blowing air into a cylindrical duct 17, as shown in FIGS. 5, 6. The design of the air deflector 11 forces the air to spin or generate a vortex within the duct using directional vanes 18 attached to the inside thereof. These vanes are configured in the form of a corkscrew, which directs the air to spin. The vortex generators may also be placed in the air deflector itself. The air is forced along the back of the ellipsoidal reflector 5 and out through the vents 15 at the interface plate 13. Because of the vortex generation within air deflector 11, the air is circulated uniformly around the back of the ellipsoid 5. The air emerges on the inside of the spherical reflector 9 and exits through the front face. The deflector 11 and air vents 15 cause a venturi effect at the central portion 3 of the reflector 5. This vacuum draws air through the lamp hole 19 at the back of the reflector resulting in efficient cooling of the lamp 1. This air joins the air being emitted through the front of the sphere 9. Cooling of the lamp end at the front of the reflector 5 is accomplished by the design of the spherical reflector. It's inward curving surface forces the air toward the lamp end together with the air drawn from the lamp. FIG. 6 shows the airflow that results from the design of the reflector 5. It is important that the diameter of the cylindrical portion of the air deflector be approximately 1.5 times larger than the lamp hole. This ensures that when air enters the back of the reflector it is predominantly directed along the back of the ellipsoid and not through the lamp hole. Otherwise the venturi effect will be diminished. It is also important for the space between the air deflector and the back of the ellipsoid to remain narrow at less than 10 mm over the entire length up to the interface plate. This ensures that a high velocity air flow occurs along the surface and that the venturi effect is maximized.

In test trials of the system shown in FIG. 6, the reflector 5 and a 6 KW lamp 1 were effectively cooled. With a single 300 CFM fan 16, the reflector temperature remains below 170° C. while the lamp temperature remained within supplier specification. The cooling design of the present invention represents an improvement over conventional cooling of a metal reflector using an 800 CFM fan for the reflector and the lamp cooling, which is characterized by a reflector temperature in the metal reflector of about 250° C.

This efficient cooling system of the present invention permits the design of a very compact glass reflector 5 for 1–6 KW lamps. The ellipsoidal reflector diameter of the successful prototype is 300 mm. By way of contrast, a conventional metal or glass reflector has a diameter of 400 mm for the same size lamp. In addition, a significant improvement in optical performance is achieved in the present invention by using a polished back surface to improve IR transmission for cooling. The present invention has been described with respect to high power digital projectors for such applications as rental staging, fixed installations, and digital cinema. The application of reflector cooling allows the overall size and cooling requirements of high-end digital projectors to be dramatically reduced. Size can be reduced by up to 25% due to the smaller reflector while noise is also reduced due to more efficient use of cooling fans, which may be made smaller in size.

The many features and advantages of the invention are apparent from the specification and, thus, it is intended by the appended claims to cover all such features and advantages at the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. In a projector having a lamp for emitting light, an ellipsoid reflector for capturing said light from a first focal point of the ellipsoid reflector and focusing said light at a second focal point co-incident with an integrator rod, a spherical reflector for retro-reflecting light through the first focal point for reflection by said ellipsoid reflector to said second focal point, the improvement comprising conforming the shape of said ellipsoid reflector and spherical reflector for channeling air over and outside of the ellipsoid reflector and along the inside of the spherical reflectors, wherein said spherical reflector has a larger diameter than said ellipsoid reflector at an interface therebetween such that air forced over and outside of the ellipsoid reflector and then passes along the inside of the spherical reflector.

2. The improvement of claim 1, wherein said ellipsoid reflector and spherical reflector are glass.

3. The improvement of claim 1, wherein said ellipsoidal reflector and spherical reflector are metal.

4. The improvement of claim 2, wherein the outer surfaces of said ellipsoid reflector and spherical reflector are polished to reduce IR light scattering and thereby increase IR transmission.

5. The improvement of claim 1, wherein said spherical reflector is shaped so as to direct airflow along an inside surface thereof onto the end of the lamp.

6. In a projector having a lamp for emitting light, an ellipsoid reflector for capturing said light from a first focal point of the ellipsoid reflector and focusing said light at a second focal point co-incident with an integrator rod, a spherical reflector for retro-reflecting light through the first focal point for reflection by said ellipsoid reflector to said second focal point, the improvement comprising conforming the shape of said ellipsoid reflector and spherical reflector for channeling air over and outside of the ellipsoid reflector and along the inside of the spherical reflector, wherein said reflectors are connected with an interface plate, said interface plate having a plurality of air vents along the circumference thereof for allowing air to pass from outside of said ellipsoid reflector to inside of said spherical reflector.

7. The improvement of claim 6, wherein an air deflector connects said ellipsoid reflector and said spherical reflector at said interface plate, said air deflector having a shape similar to an outer surface of said ellipsoid reflector.

8. The improvement of claim 7, wherein said air deflector is painted black on an inside surface thereof using high temperature paint to absorb the IR radiation transmitted through the ellipsoid reflector and prevent said IR radiation from being reflected back into said ellipsoid reflector.

9. The improvement of claim 7, further including a centrifugal blower fan for directing air over said lamp and into said spherical reflector, and for directing air into said air deflector whereupon the air is forced along said outer surface of the ellipsoid reflector and out through said air vents at said interface into said spherical reflector.

10. The improvement of claim 9, further including a duct to connect said blower fan to said air deflector, said duct having a series of vanes attached to an inner wall thereof to generate a spinning vortex of air for uniform circulation over the ellipsoid reflector.

11. The improvement of claim 7, wherein said air deflector includes a vortex generator for circulating the air uniformly around said outer surface of the ellipsoid reflector and out through said air vents at said interface into said spherical reflector at a higher velocity than the air directed over said lamp and into said spherical reflector, thereby creating a venturi effect at said first focal point for cooling said lamp.

12. The improvement of claim 7, wherein a cylindrical portion of said air deflector has a diameter larger than the diameter of a lamp entrance hole on the back of the ellipsoid reflector to permit air to flow along the outside of the ellipsoid reflector.

13. The improvement of claim 7, wherein the spacing between the air deflector and ellipsoid reflector is reduced to a narrow gap for increasing the speed of air flow over the ellipsoid reflector, thereby increasing cooling and venturi effect to draw air over the lamp.

14. The improvement of claim 6, wherein said ellipsoid reflector and spherical reflector are glass.

15. The improvement of claim 6, wherein said ellipsoidal reflector and spherical reflector are metal.

16. The improvement of claim 6, wherein the outer surfaces of said ellipsoid reflector and spherical reflector are polished to reduce IR light scattering and thereby increase IR transmission.

17. The improvement of claim 6, wherein said spherical reflector has a larger diameter than said ellipsoid reflector at an interface therebetween such that air forced over and outside of the ellipsoid reflector and then passes along the inside of the spherical reflector.

18. The improvement of claim 6, wherein said spherical reflector is shaped so as to direct airflow along an inside surface thereof onto the end of the lamp.

* * * * *